United States Patent
McCown et al.

(10) Patent No.: US 7,287,060 B1
(45) Date of Patent: Oct. 23, 2007

(54) SYSTEM AND METHOD FOR RATING UNSOLICITED E-MAIL

(75) Inventors: Steven Harvey McCown, Brighton, CO (US); Thai Nguyen, Thornton, CO (US); Steven Michael Halladay, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 895 days.

(21) Appl. No.: 10/460,070

(22) Filed: Jun. 12, 2003

(51) Int. Cl.
*G06F 15/16* (2006.01)

(52) U.S. Cl. .................. 709/206; 709/203; 709/207; 707/1

(58) Field of Classification Search ............ 709/206, 709/207, 203; 707/1
See application file for complete search history.

(56) References Cited

U.S. PATENT DOCUMENTS

| | | | |
|---|---|---|---|
| 2002/0120600 A1* | 8/2002 | Schiavone et al. ............ 707/1 |
| 2003/0069933 A1* | 4/2003 | Lim et al. .................... 709/206 |
| 2004/0019651 A1* | 1/2004 | Andaker ...................... 709/207 |
| 2004/0073617 A1* | 4/2004 | Milliken et al. ............ 709/206 |
| 2004/0177120 A1* | 9/2004 | Kirsch ........................ 709/206 |

* cited by examiner

*Primary Examiner*—Jinsong Hu
(74) *Attorney, Agent, or Firm*—Brooks Kushman P.C.

(57) ABSTRACT

A system and method for an e-mail rating system, where e-mail senders are evaluated based upon past performance. When an individual receives an email message and determines it to be SPAM, they notify a central database, repository or server. This central server, known as a Spam Detection Server or SDS, maintains a list of e-mail senders and their associated spam rating. Spam thresholds are applied to incoming e-mail by a spam filter in conjunction with the SDS. Depending upon the sender's rating as compared to these thresholds, a received message is classified as desirable, undesirable or conditional.

13 Claims, 2 Drawing Sheets

SYSTEM AND METHOD FOR RATING UNSOLICITED E-MAIL

BACKGROUND OF THE INVENTION

1. Field of the Invention

The present invention relates to data processing methods and systems, and in particular relates to methods and systems for managing e-mail, and more particularly relates to techniques for rating unsolicited e-mail or spam.

2. Background of the Invention

Of the 3.33 trillion e-mail messages sent in 2002, unsolicited and undesirable e-mail (i.e. spam) accounted for about 34% of these messages. By 2006, spam is expected to reach 52% of the total e-mail traffic worldwide. Such spam traffic not only consumes valuable system resources in the routing, delivery and intermediary storage of such spam, but also consumes and wastes the time of end-users who typically must manually filter/delete such unwanted spam messages that are received by the end-user's email system.

Many tools that combat spam have come about in recent years. There tools have features such as: blacklists/whitelists, content analysis tools, behavioral analysis tools, sender address validation, spam fingerprint tools and graphics scanning tools to check for pornography. While some very elaborate systems to detect and report spam have come about, spam still gets through to end-users. Although automated systems work faster, it is also true that the human user can more accurately identify which e-mails are considered undesirable. While that is true, most users do not want to perpetually report spam—even if reporting would provide a future benefit.

It would thus be desirable to provide an improved spam detection system and method that combines the benefits of human intervention accuracy and automation speed/efficiency.

SUMMARY OF THE INVENTION

The present invention is directed to a system and method for an e-mail rating system, where e-mail senders are evaluated based upon past performance. When an individual receives an email message and determines it to be SPAM, they notify a central database, repository or server. This central server, known as a Spam Detection Server or SDS, maintains a list of e-mail senders and their associated spam rating based on user notifications to this central server. Senders who continue to send spam after such notification will receive a lower rating than someone who does not send spam.

All messages received by the e-mail receiver are classified as desirable, undesirable, or conditional, based upon the sender's previously established rating. This classification can either be performed by the receiver's e-mail client or by the receiver's internet service provider (ISP). Spam thresholds are applied to incoming e-mail by a spam filter in conjunction with the SDS. Depending upon the sender's rating as compared to these thresholds, a received message is classified as desirable, undesirable or conditional. Messages that fall within the desirable range are delivered to the recipient immediately. Messages received from senders having a low, undesirable rating are moved into an undesirable storage area and periodically deleted after some predefined period of time. Messages from senders whose rating falls within the conditional range are handled in two ways. At first, the messages are held in a conditional storage area for a specified period of holding time, after which they are sent to the intended recipient(s). Secondly, during the intervening wait period of time, i.e. before expiration of the specified period of conditional holding time, it is possible that the sender's rating will vary either up or down. If so, the received message being held in the conditional storage area is handled according to whether the sender is subsequently rated in the desirable or undesirable range as determined by the spam threshold.

The spam server can either operate as a standalone service over the Internet, as a plug-in to an ISP's or existing e-mail server, or as a plug-in to a user's e-mail client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
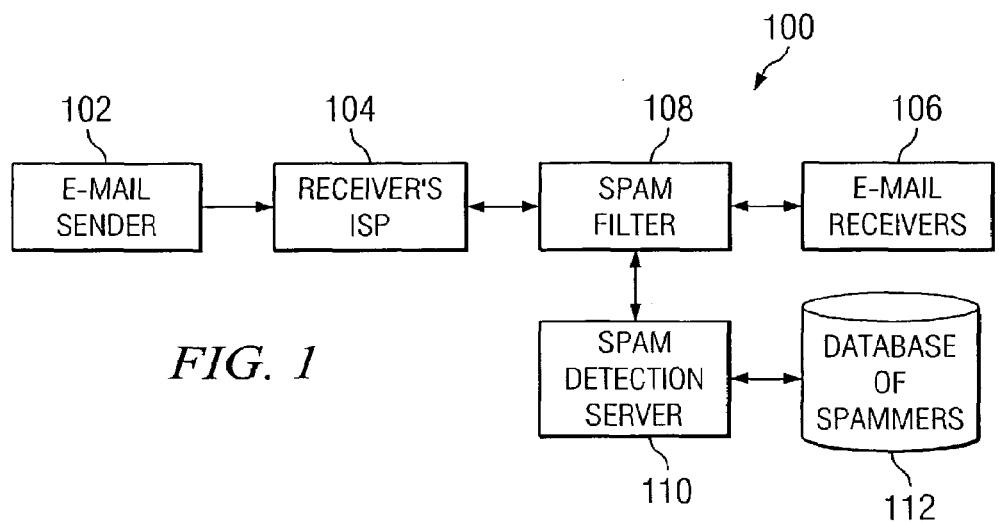
FIG. 1 depicts an unsolicited email message system with a spam filter operating in conjunction with the email receiver.

Referring now to FIG. 1, there is shown an overall system architecture at 100 of one embodiment of the present invention. In this embodiment, the spam detection process operates in conjunction with an e-mail client system of an end-user. An e-mail originates from e-mail sender 102. This e-mail will contain an address of its intended recipient. In the preferred embodiment, this e-mail address is comprised of two portions separated by an '@' symbol. The portion to the left of the '@' symbol is the name or handle of the particular intended recipient of the e-mail, and the portion to the right of the '@' symbol is the name of the intended recipient's internet service provider (ISP). For example, an e-mail address of jane@aol.com indicates that the ISP is aol.com, and the intended recipient of the e-mail is jane at this aol.com ISP. As is known, it is also possible to have the same user name at another ISP without conflict. Thus, a recipient address of jane@earthlink.net indicates that the ISP is earthlink.net, and the recipient of the e-mail is jane at this earthlink.net ISP.

The e-mail is sent to the appropriate receiver's ISP 104 based on this intended receiver's address. The receiver's ISP will then forward this e-mail on to the e-mail receiver or recipient 106. This is typically a computer or portable electronic device (e.g. personal, digital assistant or cell phone) having hardware and/or software capable of receiving, storing and displaying e-mail messages for an end-user. In this particular embodiment, there is a spam filter 108 that is associated with and operates in conjunction with the e-mail receiver 106. This spam filter selectively passes e-mails received from receiver ISP 104 and which are destined to e-mail receiver 106. This selective passage of emails is accomplished in concert with Spam Detection Server (SDS) 110. SDS 110 is a centralized server that maintains ratings for senders of e-mail using database 112. The operation of system 100 will now be described with reference to FIG. 2.

Figure 2:
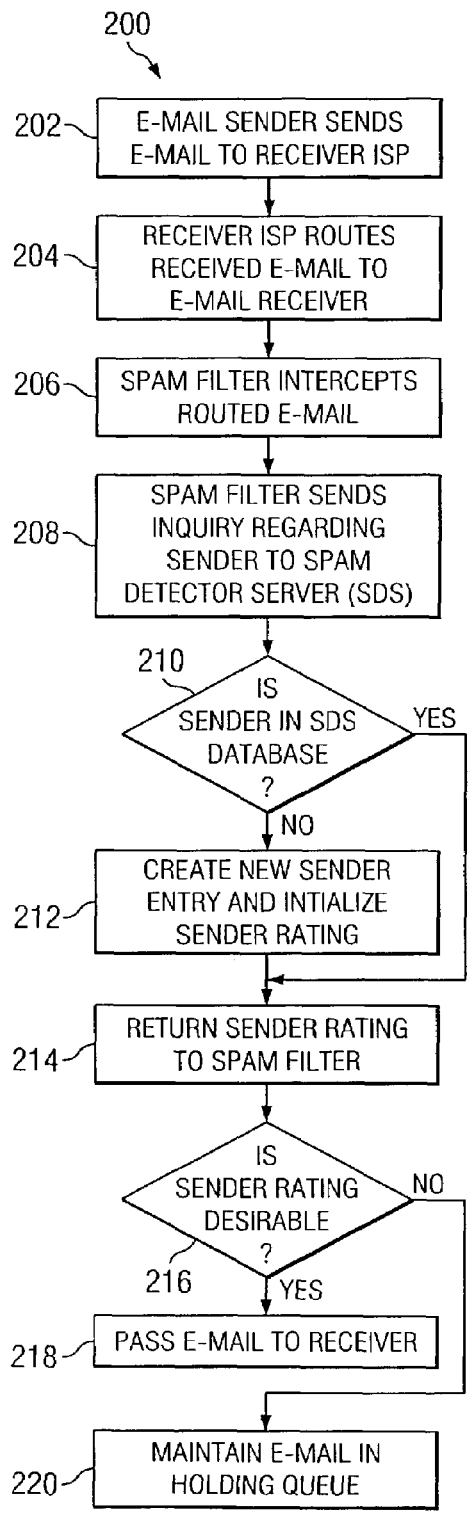
FIG. 2 depicts an overall process flow for an email message sent from a sender and destined for a receiver, in accordance with the system depicted in FIG. 1.

Referring now to FIG. 2, process 200 is initiated at 202 when an email sender (such as email sender 102 of FIG. 1) sends an email to an intended receiver/recipient (such as email receiver 106 of FIG. 1). This email first travels to the receiver's ISP, which is capable of routing the email to the intended receiver/recipient at 204 based upon the receiver's email address contained in the email message. After being routed to the e-mail receiver, the email gets intercepted by a spam filter at 206. In this embodiment, the spam filter is a part of the receiver's computer/device, and is implemented as a plug-in to a traditional mail receiver such as Microsoft's Outlook email system. Upon receipt of the email, the spam filter sends an inquiry to a Spam Detection Server (SDS) at 208, such inquiry including the identity of the sender of the email. The Spam Detection Server is a centralized server, such as element 110 of FIG. 1, that is used to maintain a database of e-mail senders and their associated spam ratings. The Spam Detection Server checks its database of spammers at 210 to determine if this particular sender is already a part of its spammer database. If so, the SPS returns the sender's rating to the spam filter at 214. If not, the SPS creates a new sender entry in its spammer database and initializes the new sender's rating. The initialization value is set such that this first email message will pass through the spam filter to email receiver, such that a determination can be made on whether to accept subsequent email messages from this sender. Thus, the initialization value for the sender is set to a conditional spam value. In the preferred embodiment, the spam ratings are values from 0-999, with 500 being the acceptable spam threshold value. Thus, the initial spam rating for this sender is set to 500. In alternate embodiments, other rating ranges could be used, such as a scale of 0 to 99, and/or the threshold determination could be reversed such that ratings less than a threshold are deemed to be good or acceptable spam ratings. Continuing with FIG. 2, after the new sender entry has been created and the associated sender's rating has been initialized at 212, SDS returns this initial sender rating to the spam filter at 214. Upon receipt of the sender rating by the spam filter, the spam filter determines at 216 whether the rating is a good, acceptable or desirable spam rating—in this particular embodiment whether the rating exceeds the acceptable spam threshold of five hundred (500). If it is an acceptable or desirable rating, the email is immediately passed on to the receiver at 218 for receipt by an end user in normal fashion. If it is not an acceptable rating, the email is maintained in a holding queue at 220, where it is not immediately passed on to the end user's inbox. Email messages in the holding queue can be browsed by the end-user, and may be periodically deleted from the email receiver's system, as will be further described in detail below.

Figure 3:
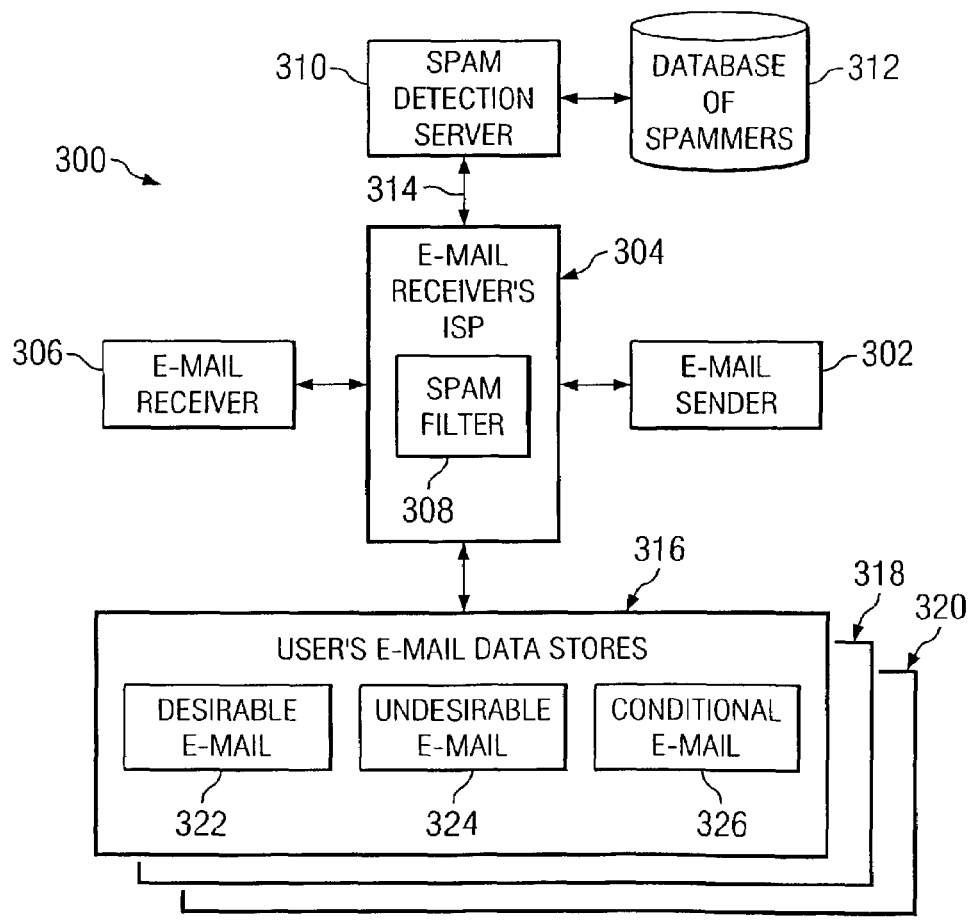
FIG. 3 depicts an unsolicited email message system with a spam filter operating in conjunction with the email receiver's internet service provider (ISP).

Turning now to FIG. 3, there is shown another embodiment for the present invention at 300, wherein the spam filter operates in conjunction with the email receiver's Internet Service Provider (ISP) system 304. An email sender 302 sends messages intended for email receiver 306, and these messages are processed by intermediary email receiver ISP 304, which is the internet service provider for the particular receiver for which the email is being sent to. This email receiver ISP 304 contains a spam filter 308, which is similar to the spam filter 108 shown in FIG. 1. Email receiver ISP 304 communications via path 314 with Spam Detection Server 310, which is similar to the Spam Detection Server 110 of FIG. 1. The Spam Detection Server is coupled to a database of spammer ratings 312, where spam ratings are maintained for email senders. Also shown in FIG. 3 are data storage mailboxes 316, 318 and 320 for various users of this particular ISP 304. Data store 316 would be associated with a first user, data store 318 would be associated with a second user, data store 320 would be associated with a third user, etc. Each of the data store mailboxes maintain a copy of email messages sent to an intended email receiver such as receiver 306. As can be seen, the aggregate mailbox for a particular user is segregated into three logical classes—desirable email 322, undesirable email 324 and conditional email 326. The operation of system 300 will now be described with reference to FIG. 4.

Figure 4:
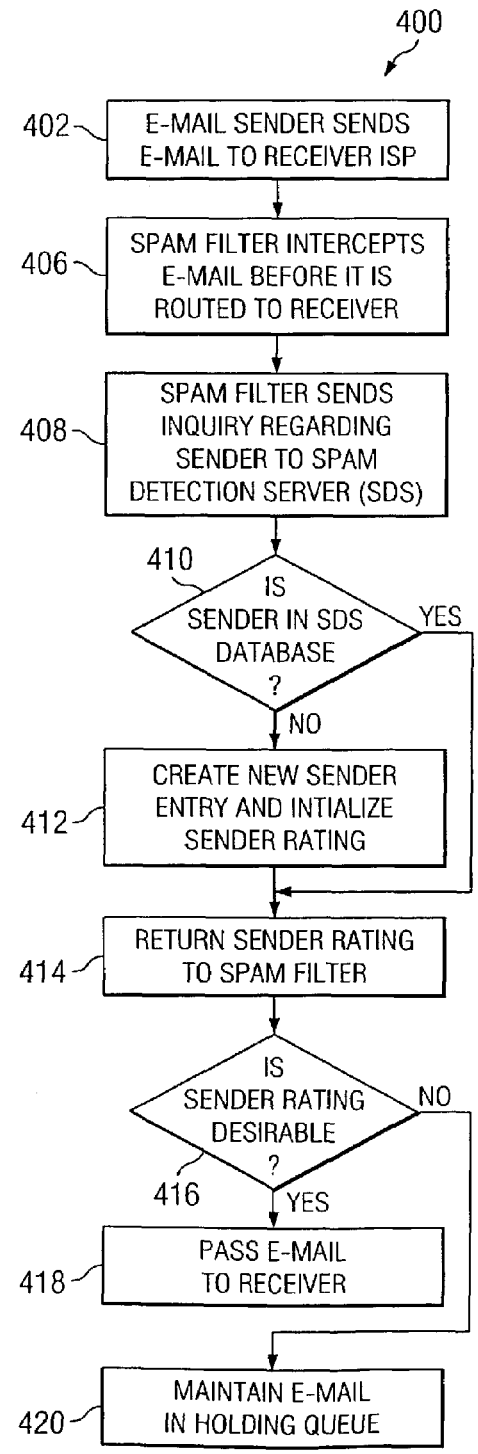
FIG. 4 depicts an overall process flow for an email message sent from a sender and destined for a receiver, in accordance with the system depicted in FIG. 2.

Referring now to FIG. 4, process 400 is initiated at 402 when an email sender (such as email sender 102 of FIG. 1) sends an email to an intended receiver/recipient (such as email receiver 106 of FIG. 1). This email first travels to the receiver's ISP, which is capable of routing the email to the intended receiver/recipient. The email gets intercepted by a spam filter at 406 before the ISP routes the email to its intended recipient's mailbox. In this embodiment, the spam filter is a part of the receiver's ISP, and is implemented as a plug-in to a traditional ISP mail server system. Upon receipt of the email, the spam filter sends an inquiry to a Spam Detection Server (SDS) at 408, such inquiry including the identity of the sender of the email. The Spam Detection Server is a centralized server such as element 110 of FIG. 1 that is used to maintain a database of e-mail senders and their associated spam ratings. The Spam Detection Server checks its database of spammers at 410 to determine if this particular sender is already a part of its spammer database. If so, the SPS returns the sender's rating to the spam filter at 414. If not, the SPS creates a new sender entry in its spammer database and initializes the new sender's rating. The initialization value is set such that this first email message will conditionally pass through the spam filter to email receiver, such that a determination can be made on whether to accept subsequent email messages from this sender. Thus, the initialization value for the sender is set to a conditional spam value. After the new sender entry has been created and the associated sender's rating has been initialized at 412, SDS returns this initial sender rating to the spam filter at 414. Upon receipt of the sender rating by the spam filter, the spam filter determines at 416 whether the rating is a good, acceptable or desirable spam rating—in this particular embodiment whether the rating exceeds the acceptable spam threshold of five hundred (500). If it is an acceptable rating, the email is passed on to the receiver at 418 for receipt by an end user. If it is not an acceptable rating, the email is maintained in a holding queue at 420, where it is not immediately passed on to the end user's inbox. Email messages in the holding queue can be browsed by the end-user, and may be periodically deleted from the email receiver's system, as will be further described in detail below.

The sender ratings which are maintained by Spam Detection Server 110 or 310 are influenced by determinations made by end-users who receive emails at email receivers such as 106 and 306. When an end user receives an email message and they determine that it is unsolicited spam, a notification is sent to the SDS that spam has been received. This notification also includes the sender's email address. This sender's email address can optionally include wildcards such as an '*', so that emails from an entire domain could be flagged as being undesirable. For example, the email address sent from the user in the server spammer notification could be '*.irq', and all email addresses at the irq domain would be rated as being undesirable by the user. To return this global spam rating, a dialogue box is optionally presented to the end-user when they desire to flag an email message as spam, and this dialogue box includes the sender's email address. This sender's email address is modifiable by the end-user to allow them to modify the sender's address to include such global wildcards.

The end-user initiates the spam notification action in one of several different ways. For intelligent email systems with integrated spam functionality, such as a plug-in module that installs a Spam Server Notification toolbar on the email client system, the user would select such toolbar upon receipt of undesirable spam, and the email client system would automatically send a spam notice to the spam server. Alternatively, the user could forward the received spam to some centralized server address, such as 'abuse@SDS.com'.

The Spam Detection Server 110/310 maintains sender ratings in a database 112/312. These ratings are influenced by receipt of spam notifications by end users who receive unsolicited e-mail. While there are many ways to rate senders, the approach taken here is as follows.

A sender is initially given a rating of five hundred (500), which is the default acceptable spam threshold. A rating of five hundred is a conditional rating, meaning that the sender's status as being a spammer is not presently known. A numeric rating greater than five hundred means that the sender is not a spammer, and a numeric rating equal to or less than four hundred fifty means the sender is a spammer. Of course, other scales and thresholds are possible within the scope of the present invention, such as use of a rating range of 0-to-9 or 0-to-99, for example. Similarly, spammers could be given ratings greater than the spam threshold and good (non-spam) email could be given ratings less than the threshold. In the preferred embodiment, as previously mentioned, the sender's rating is initialized to five hundred, meaning a conditional rating, and ratings greater than five hundred (500) are considered good, acceptable, or desirable ratings. If the SDS subsequently receives a spam notification from a receiver for a particular sender, that sender's rating is decreased by one (1). If the SDS subsequently receives a spam notification from a receiver for this particular sender, that sender's rating is also decreased by one (1). Because the bad/unacceptable threshold is set at four hundred fifty (450), fifty end users would have to send a spammer notice to this SDS for a particular sender in order to place the sender's rating at a value that is less than the unacceptable spam threshold of four hundred fifty. This lower rating would then be sent to the spam filter upon receipt of any subsequent emails from this sender, as previously described with respect to FIGS. 2 and 4. Thus, subsequent email messages from a sender with a rating below the unacceptable spam threshold would have these subsequent messages blocked by the spam filter and placed in the holding queue. Providing a bad/unacceptable threshold at four hundred fifty and a good/acceptable threshold value at five hundred effectively creates a fifty point conditional buffer. Thus, fifty users would have to send a spam notice to the SDS in order to lower the spam rating of the sender enough such that the sender is rated as a spammer. This fifty point buffer prevents a single user from being able to label a sender as a spammer. Rather, a certain number of receivers—in this case fifty—would have to send a spammer notice to the server to label a sender as a spammer. Of course, this conditional rating buffer could be set to a number greater than or less than fifty as dictated by the needs of the system. The key point being that some conditional buffer is desirable in the preferred embodiment to prevent a single unhappy receiver from labeling a sender as a spammer. The larger the conditional buffer size, the greater the number of spammer notices that would have to be received by the SDS before the sender is rated a spammer by having a rating below the bad/unacceptable spammer threshold.

As can be seen by the user email data store 316, 318 and 320 in FIG. 3, received emails are categorized into three categories in the preferred embodiment—desirable, undesirable, and conditional. Desirable emails are from senders having a rating above (or in an alternate embodiment, below) an acceptable spam threshold. Undesirable emails are from senders having a rating below (or in an alternate embodiment, above) an undesirable spam threshold. Conditional emails are those having a rating between the unacceptable and acceptable spam thresholds—in this particular embodiment, ratings between four hundred fifty and five hundred. Desirable emails are immediately placed in a receiver's inbox for normal email viewing and processing. Conditional and undesirable emails are placed in holding queues such as shown at 324 and 326, respectively, in FIG. 3. Email messages placed in the undesirable holding queue can still be viewed by a user. A mailbox called Undesirable Spam is created in the receiver's email system to allow such viewing. Email messages in this holding queue are periodically deleted at some system-specified or user-specified time interval such as thirty (30) days. Email messages placed in the conditional holding queue can similarly still be viewed by a user. A mailbox called Conditional Spam is created in the receiver's email system to allow such viewing. Email messages in this holding queue are delayed in their delivery to their intended recipient according to some settable time interval, and in addition may be periodically re-classified based upon a given sender's possible change in status.

For example, when the very first email from a given sender is received, the sender's status is initialized to a rating of five hundred (500), meaning that the email is placed in the conditional holding queue as its status as being spam is unknown (since this is the first email message received from this particular sender). If the user views mail in their Conditional Spam mailbox, and determines that the email is in fact spam, the user would notify the SDS as previously described, resulting in a lowering of the sender's spam rating. If fifty or more receivers notified the SDS that this is spam, the senders rating would be decremented by one for each receiver notice, resulting in the sender having a spam value below the unacceptable spam rating threshold. Upon a subsequent periodic scanning of the Conditional Spam mailbox by the email client system, any email from this sender would be reclassified as undesirable spam based on this lower rating, and all such emails in the Conditional Spam mailbox would then be moved to the Undesirable Spam mailbox for purging during the next purge interval of the Undesirable Spam mailbox.

It is also possible that the sender with the conditional rating has actually had an improvement made to their spam rating. This is possible since the SDS server knows what emails were sent to a recipient/receiver from a particular sender such as by maintaining an email traffic log. If no negative spammer notice is received by the server after some predetermined time period such as one day or one week, the server presumes that the email was desirable/acceptable to the receiver, and was not spam. In that case, the rating of the sender will be updated by the SDS accordingly, such as by increasing the spam rating by one for each sent email that is presumed to be acceptable. In this way, a sender who has been labeled as a spammer (by having a spam rating below the unacceptable spam threshold) can actually rehabilitate their rating by sending out good/acceptable emails which effectively counter-balances any bad/unacceptable emails that were previously sent.

Assuming the spam rating for emails in the Conditional Spam mailbox have not dropped below the unacceptable threshold, and have not risen above the acceptable threshold, then after some period of time (the conditional queue hold time), these conditional emails are sent to their intended recipients for normal processing. Thus, an email from a new sender that does not yet have a spam rating is effectively delayed in delivery to the intended recipient. This allows for the possibility that others will label the sender as being a spammer while the email is in a given end-user's Conditional Spam mailbox, thereby causing the unread email to subsequently be placed in the end-users Spam mailbox without any action from that particular end user.

In effect, the conditional holding queue for Conditional Spam merely results in delayed delivery of emails if the sender's rating doesn't change during the conditional queue hold time. If the sender's rating does change during the conditional queue hold time, the email is treated according to whether the sender's rating has changed to unacceptable or acceptable, using techniques as previously described.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rating a sender of e-mail, comprising the steps of:
   receiving an e-mail from the sender;
   determining if the e-mail is unsolicited spam;
   sending a spam server a notification of whether the received e-mail is unsolicited spam;
   maintaining a sender rating by the spam server;
   placing the e-mail in a holding queue if the sender rating for the e-mail is not acceptable;
   periodically checking the e-mail in the holding queue to determine if the sender of the e-mail has an acceptable rating; and
   if the sender's rating is now acceptable, sending the e-mail to its intended recipient.

2. The method of claim 1, wherein the notification includes an e-mail address of the sender.

3. The method of claim 1, wherein the notification includes a global domain of the sender.

4. A system for rating a sender of e-mail, comprising:
   means for receiving an e-mail from the sender;
   means for determining if the e-mail is unsolicited spam;
   means for sending a spam server a notification of whether the received e-mail is unsolicited spam;
   means for maintaining a sender rating by the spam server;
   means for placing the e-mail in a holding queue if the sender rating for the e-mail indicates the sender is not acceptable;
   means for periodically checking the e-mail in the holding queue to determine if the sender of the e-mail has an acceptable rating; and
   means for sending the e-mail to its intended recipient if the sender's rating is now acceptable.

5. The system of claim 4, wherein the notification includes an e-mail address of the sender.

6. The system of claim 4, wherein the notification includes a global domain of the sender.

7. A method of processing e-mail, comprising the steps of:
   receiving an e-mail from a sender;
   determining a spam rating for the sender;
   if the spam rating is acceptable, sending the e-mail to the receiver;
   if the spam rating is not acceptable, maintaining the e-mail in a holding queue;
   periodically checking the e-mail in the holding queue to determine if the sender of the e-mail has an acceptable rating; and
   if the sender's rating is now acceptable, sending the e-mail to its intended recipient.

8. The method of claim 7, wherein the spam rating is acceptable if it is above a predetermined threshold.

9. The method of claim 7, wherein the spam rating is acceptable if it is below a predetermined threshold.

10. The method of claim 7, wherein the spam rating is not acceptable if it is undefined.

11. The method of claim 7, wherein the step of determining a spam rating for the sender comprises the step of sending an inquiry regarding the sender to a spam server.

12. The method of claim 7, further comprising the step of:
    if the sender's rating is still not acceptable, placing the e-mail in a purge mailbox.

13. The method of claim 12 wherein the purge mailbox is periodically purged according to a purge interval.

* * * * *